June 19, 1956  C. E. SORING  2,750,675
TEST INDICATOR
Filed Sept. 13, 1955

INVENTOR.
Clarence E. Soring
BY
Atty.

United States Patent Office 2,750,675
Patented June 19, 1956

2,750,675
TEST INDICATOR
Clarence E. Soring, Portland, Oreg.

Application September 13, 1955, Serial No. 534,001

6 Claims. (Cl. 33—172)

My invention relates to a handle or mounting device for supporting a test indicator which is used by tool makers, machinists and setup men to measure the internal and external diameters of apertures or surfaces of a work piece. It is used generally with machine tools such, for example, as milling machines, boring machines, drill presses and lathes. Dial test indicators and gauges have been commonly used for a long period of time. Most adapters, handles, or mounts are of such size and configuration that they cannot reach down into holes or apertures of substantial depth or within restricted apertures and yet be readable by a machinist. I have determined that if an elongated gauge or indicator is mounted upon an axial handle of small compass that such a gauge or indicator may be read by the use of a dental mirror, for example.

The object of my invention is thus to provide a handle or mount for a test indicator which will permit it to be inserted in an aperture of small compass, to be adjusted to the configuration of the surface to be measured, and to be readable.

A further, and more particular, object of my invention is to provide a handle for this purpose particularly adapted for a test indicator that is of elongated form, having a dovetailed slot-type head, and is of slim elongated configuration. For such device I provide a handle or mount and a coupling device which is likewise of small compass and which permits the angularity of said mount or handle, and that of said elongated indicator, to be adjusted and fixed securely and easily so that a true and correct reading may be obtained.

A further and more specific object of my invention is to provide a handle and an articulated connection therefor, which present no projecting portions which limit the entry and readability of said test indicator into an aperture of small compass or one of substantial depth. Said device may be so proportioned that a dental mirror may also be inserted in said cavity or hole and thus the dial may easily be read by a machinist.

Further and other details of my invention are hereinafter described with reference to the accompanying drawings, in which.

Figure 1:
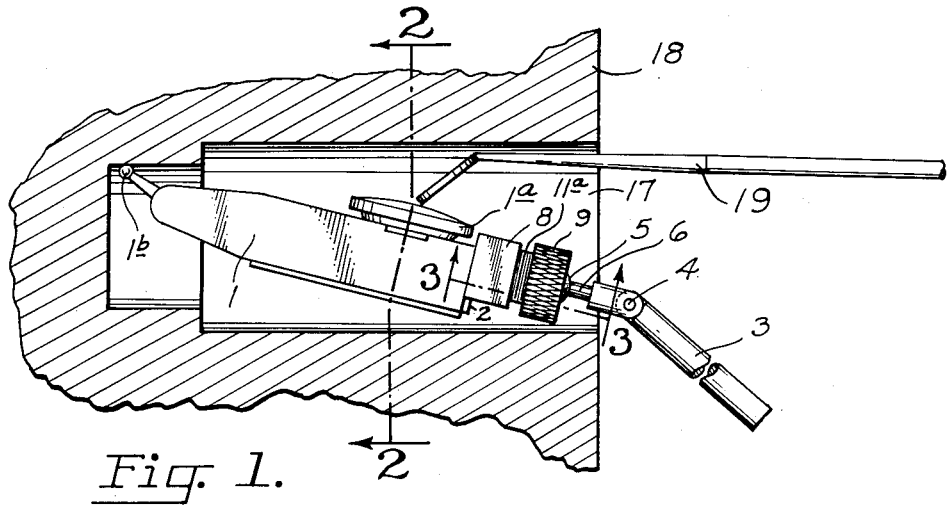
Fig. 1 is an elevation of a device embodying my invention shown inserted in a hole in a work piece and said view illustrates the manner in which the dial of said indicator may be read by the use of a dental mirror.
Figure 2:
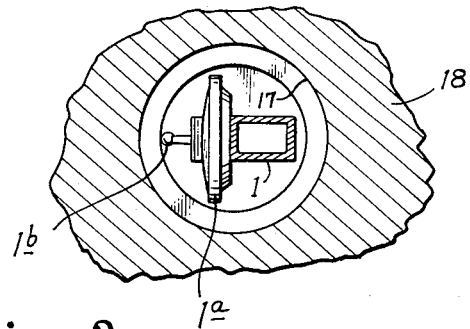
Fig. 2 is a sectional view taken on the line 2—2 in Fig. 1.

My invention is associated with a gauge or test indicator 1 of conventional type provided with a dovetail-type joining end 2. This particular type is most adaptable for use of my invention because it is elongated, is of small compass, and is adapted to fit within relatively deep holes and in other confined recesses or areas. My invention is not to be deemed limited to this type of gauge but it is illustrated in connection with my invention because it facilitates an explanation of the adaptability of the handle or mount with which my invention is particularly concerned.

The handle or mount to which my invention is primarily directed comprises a shank 3 which is usually, but not necessarily, provided with a pivotal connection 4. Said shank is usually of substantial length and is commonly mounted upon some stationary support. Said shank terminates in a ball-shaped end 5 having a neck portion 6 of small diameter so as to permit the ball-shaped end to swivel in its associated connector which will later be described. Said neck portion preferably is screw-fitted into a socket 3a in the end of the shank 3 by threads 6a for ease of assembly.

Joining said shank and the gauge or test indicator is a joining element 7 comprising a first coupling element 8 and a second coupling element 9. The first coupling element has a companion face 10 which is complementary to and engages the dovetail-type joining end 2 of the gauge 1. Said complementary joint permits the engagement and disengagement of said test indicator by lateral shifting of the parts with respect to each other. At the other end of the first coupling element 8 is an annular stem 11 of smaller diameter than the periphery of said coupling element.

Figure 3:
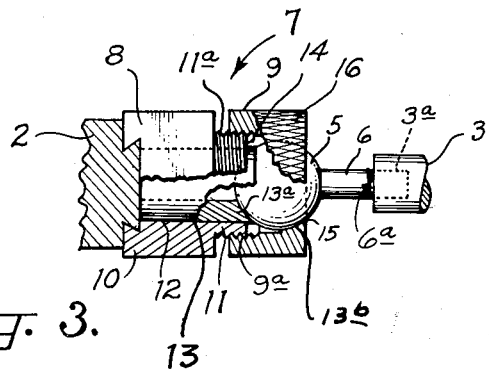
Fig. 3 is a longitudinal section shown on slightly enlarged scale illustrating the details of the coupling and joining devices with which may invention is particularly concerned.

A bore 12 extends axially through said first coupling element and through said stem. In said bore is slidably arranged a sleeve 13 which is longer than the overall length of the said first coupling element. One end of said sleeve bears against the dovetail-type joining end 2 of the gauge or test indicator 1 and the other end 13a projects beyond the stem, as is shown in Fig. 3. In said projecting end is formed a concave recess 13b which accommodates the ball-shaped end 15 of the shank, in swiveling relationship therewith.

The second coupling element 9 is cup-shaped and is provided with internal threads 9a which engage external threads 11a on the stem 11 of the first coupling element. Said cup-shaped coupling element 9 defines an internal chamber which accommodates the projecting end 13a of the sleeve and the ball-shaped end 5 of the shank 3. A concave socket 15 is also formed in the coupling element 9 and said socket opens to the external face of said coupling element. It is complementary to the ball-shaped end 5 of the shank. The peripheral surface of said coupling element 9 is roughened as by knurling 16 so as to permit the coupling 9 to be digitally gripped and moved into engaging threaded position with the threaded end of the other coupling element 8.

The function of the slidable sleeve 13 is to engage the peripheral surface of the ball-shaped end 5 at one end in its concave recess 13b and to engage in face-to-face relationship the dovetail-type joining end 2 of the gauge or test indicator 1. Axial thrust is generated when the coupling 9 is rotated and the threaded portions are brought into greater engagement. As a matter of fact, substantial thurst may be produced until friction tends to prevent movement of the connections between the shank and the work piece and with respect to each other. That is to say, when the coupling 9 is set down tightly the parts are rigidly joined. When the second coupling element is backed off, said parts are relaxed and articulation thereof is possible. Relaxing of the thrust and consequent friction imposed by the sleeve 13 against the dovetailed joining end 2 of the gauge or test indicator permits the latter to be slid sideways for adjustment or disengagement. When a gauge or test indicator supported by a handle and coupling elements embodying my invention is used in a relatively deep or restricted hole or aperture such as 17 in a work piece 18, as illustrated in Fig.

1, it permits a relatively wide degree of movement and yet provides sufficient space for a machinist to insert a dental mirror 19 into said hole or aperture so that he may read the dial portion 1a of said test indicator.

A test indicator with a handle and joined devices, as above described, is used in testing an aperture in a work piece, said parts are mounted and adjusted in the usual manner so as to arrange the feeler 1b upon the surface to be tested or measured. My invention is not concerned with the various types of mounts or supports for accomplishing this purpose. Suffice to say that when the parts are arranged substantially as shown in Fig. 1, they occupy such little area that a reading may be had either directly or by the use of a dental mirror, as is illustrated. The gauge or test indicator may easily and quickly be detached from the coupling portion of the elongated handle with which my invention is concerned and the parts may be angularly adjusted and secured in said adjustment easily and quickly merely by backing off the coupling element 2 and may be fixed by tightening it down. As a matter of fact, due to their construction and arrangement, it is possible to slacken off and tighten said couplings without disturbing the mount or support.

I claim:

1. In combination with a dial-type test indicator, a handle comprising an elongated shank having a smaller cross section than that of said test indicator with which it is joined and terminating in a ball-shaped end, said handle also comprising a joining element lying intermediate said shank and said indicator, said joining element comprising a pair of complementary couplings screw-fitted to each other, said joining element having a first coupling provided with a face for engaging said test indicator and holding it against relative rotation therewith and having an opposite face with one half of a screw fitting formed thereon, a sleeve slidably mounted for axial movement in said first coupling and extending to the first mentioned face of said first coupling, said sleeve having a greater overall length than that of said first coupling and having one end projecting therefrom, said projecting sleeve end having a concave recess formed therein, and a second threaded coupling screw-fitted to said first coupling and being of cup-shaped form having an internal chamber accommodating the projecting end of said sleeve and defining a socket for receiving the ball-shaped end of said shank, the ball-shaped end of said shank being seated in the recess formed in the end of said sleeve, whereby, when said screw fitted complementary couplings are rotated in one direction locking friction is induced between them and the parts that they join, by a force transmitted through said slidable sleeve from said ball-shaped end directly upon the test indicator connection, to hold said joining element rigid, and when said couplings are rotated in the opposite direction said locking friction is relaxed to permit said elements to articulate.

2. In combination with a dial-type test indicator, a handle comprising an elongated shank having a smaller cross section than that of said test indicator with which it is joined and terminating in a ball-shaped end, said handle also comprising a joining element lying intermediate said shank and said indicator, said joining element comprising a pair of complementary couplings screw-fitted to each other, said joining element having a first coupling provided with a face for engaging said test indicator and holding it against relative rotation therewith and having an opposite face carrying an axially projecting annular stem, a sleeve slidably mounted for axial movement in said first coupling and extending to the first mentioned face of said first coupling, said sleeve having a greater overall length than that of said first coupling and having one end projecting therefrom, said projecting sleeve end having a concave recess formed therein, said stem being externally threaded, and a second threaded coupling screw-fitted to the stem of said first coupling and being of cup-shaped form having an internal chamber accommodating the projecting end of said sleeve and defining a socket for receiving the ball-shaped end of said shank, the ball-shaped end of said shank being seated in the recess formed in the end of said sleeve, whereby, when said screw fitted complementary couplings are rotated in one direction locking friction is induced between them and the parts that they join, by a force transmitted through said slidable sleeve from said ball-shaped end directly upon the test indicator connection, to hold said joining element rigid, and when said couplings are rotated in the opposite direction said locking friction is relaxed to permit said elements to articulate.

3. In combination with a dial-type test indicator, a handle comprising an elongated shank having a smaller cross section than that of said test indicator with which it is joined and terminating in a ball-shaped end, said handle also comprising a joining element lying intermediate said shank and said indicator, said joining element comprising a pair of complementary couplings screw-fitted to each other, said joining element having a first coupling provided with a laterally disposed interlocking face for engaging said test indicator and holding it against relative rotation therewith and having an opposite face carrying an axially projecting annular stem, said stem being of smaller peripheral outline than the remainder of said first coupling, a sleeve slidably mounted for axial movement in said first coupling and extending to said interlocking face of said first coupling, said sleeve having a greater overall length than that of said first coupling and having one end projecting therefrom, said projecting sleeve end having a concave recess formed therein, said stem being externally threaded, and a second threaded coupling screw-fitted to the stem of said first coupling and being of cup-shaped form having an internal chamber accommodating the projecting end of said sleeve and defining a socket for receiving the ball-shaped end of said shank, the ball-shaped end of said shank being seated in the recess formed in the end of said sleeve, whereby, when said screw fitted complementary couplings are rotated in one direction locking friction is induced between them and the parts that they join, by a force transmitted through said slidable sleeve from said ball-shaped end directly upon the test indicator connection, to hold said joining element rigid, and when said couplings are rotated in the opposite direction said locking friction is relaxed to permit said elements to articulate.

4. An elongated handle for holding a dial-type test indicator within a restricted portion of a work piece, said handle comprising an elongated shank having a smaller cross section than that of said test indicator with which it is joined and terminating in a ball-shaped end, said handle also comprising a joining element lying intermediate said shank and said indicator, said joining element comprising a pair of complementary couplings screw-fitted to each other, said joining element having a first coupling provided with a face for engaging said test indicator and holding it against relative rotation therewith and having an opposite face with one half of a screw fitting formed thereon, a sleeve slidably mounted for axial movement in said first coupling and extending to the first mentioned face of said first coupling, said sleeve having a greater overall length than that of said first coupling and having one end projecting therefrom, said projecting sleeve end having a concave recess formed therein, and a second threaded coupling screw-fitted to said first coupling and being of cup-shaped form having an internal chamber accommodating the projecting end of said sleeve and defining a socket for receiving the ball-shaped end of said shank, the ball-shaped end of said shank being seated in the socket formed in the end of said sleeve, whereby, when said screw fitted complementary couplings are rotated in one direction locking friction is induced between them and the parts that they join, by a force transmitted through said slidable sleeve from said ball-shaped end directly upon the test indicator connection, to hold said joining element rigid, and when said couplings are rotated in the opposite direction said locking friction is relaxed to permit said elements to articulate.

5. In combination with a dial-type test indicator, a handle comprising an elongated shank having a smaller cross section than that of said test indicator with which it is joined and terminating in a ball-shaped end, said handle also comprising a joining element lying intermediate said shank and said indicator, said joining element comprising a pair of complementary couplings screw-fitted to each other, said joining element having a first coupling provided with a face for engaging said test indicator and holding it against relative rotation therewith and having an opposite face with one half of a screw fitting formed thereon, a sleeve slidably mounted for axial movement in said first coupling and extending to the first mentioned face of said coupling, said sleeve having a first end, said sleeve first end having a concave recess formed therein, and a second threaded coupling screw-fitted to said first coupling and being of cup-shaped form having an internal chamber accommodating the first end of said sleeve and defining a socket for receiving the ball-shaped end of said shank, the ball-shaped end of said shank being seated in the recess formed in the first end of said sleeve, whereby, when said screw fitted complementary couplings are rotated in one direction locking friction is induced between them and the parts that they join, by a force transmitted through said slidable sleeve from said ball-shaped end to a second sleeve end bearing directly upon the test indicator connection, to hold said joining element rigid, and when said couplings are rotated in the opposite direction said locking friction is relaxed to permit said elements to articulate.

6. In combination with a dial-type test indicator, a handle comprising an elongated shank having a smaller cross section than that of said test indicator with which it is joined and terminating in a ball-shaped end, said handle also comprising a joining element lying intermediate said shank and said indicator, said joining element comprising a pair of complementary couplings screw-fitted to each other, said joining element having a first coupling provided with a face for engaging said test indicator and and holding it against relative rotation therewith and having an opposite face with one half of a screw fitting formed thereon, a member slidably mounted for axial movement in said first coupling and extending to the first mentioned face of said coupling, said member having a first end, and a second threaded coupling screw-fitted to said first coupling and being of cup-shaped form having an internal chamber defining a socket for receiving the ball-shaped end of said shank, the ball-shaped end of said shank bearing against the first end of said member, whereby, when said screw fitted complementary couplings are rotated in one direction locking friction is induced between them and the parts that they join, by a force transmitted through said slidable member from said ball-shaped end to a second member end bearing directly upon the test indicator connection, to hold said joining element rigid, and when said couplings are rotated in the opposite direction said locking friction is relaxed to permit said elements to articulate.

No references cited.